(12) United States Patent
Itoga

(10) Patent No.: US 10,727,522 B2
(45) Date of Patent: Jul. 28, 2020

(54) METHOD OF MANUFACTURING FUEL CELL CASE

(71) Applicant: TOYOTA JIDOSHA KABUSHIKI KAISHA, Toyota-shi, Aichi-ken (JP)

(72) Inventor: Michitaro Itoga, Okazaki (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 245 days.

(21) Appl. No.: 14/928,292

(22) Filed: Oct. 30, 2015

(65) Prior Publication Data

US 2016/0141702 A1 May 19, 2016

(30) Foreign Application Priority Data

Nov. 13, 2014 (JP) ................. 2014-230492

(51) Int. Cl.
*H01M 8/24* (2016.01)
*H01M 8/2475* (2016.01)

(52) U.S. Cl.
CPC ...... *H01M 8/2475* (2013.01); *H01M 2250/20* (2013.01); *Y02P 70/56* (2015.11); *Y02T 90/32* (2013.01)

(58) Field of Classification Search
CPC .. H01M 8/2475; H01M 2250/20; Y02T 90/32
See application file for complete search history.

(56) References Cited

U.S. PATENT DOCUMENTS

| 5,620,582 | A | * | 4/1997 | Lerner | ................. | C25D 11/04 |
| | | | | | | 204/229.5 |
| 2004/0131917 | A1 | * | 7/2004 | Mazza | ................ | H01M 8/0206 |
| | | | | | | 428/304.4 |
| 2009/0286120 | A1 | | 11/2009 | Yamaguchi et al. | | |
| 2013/0293335 | A1 | * | 11/2013 | Yoshikawa | ............. | H01F 27/02 |
| | | | | | | 336/192 |
| 2015/0197165 | A1 | | 7/2015 | Katano et al. | | |

FOREIGN PATENT DOCUMENTS

| JP | S49-112809 U | 9/1974 |
| JP | S53-106721 U | 8/1978 |
| JP | 2002-344154 A | 11/2002 |
| JP | 2004-186097 A | 7/2004 |
| JP | 2006-299328 A | 11/2006 |
| JP | 2007-109624 A | 4/2007 |
| JP | 2010-188965 A | 9/2010 |
| JP | 2012-224897 A | 11/2012 |
| JP | 2014-151664 | 8/2014 |
| WO | WO2013/161059 A1 | 10/2013 |

* cited by examiner

*Primary Examiner* — Ula C Ruddock
*Assistant Examiner* — Frank A Chernow
(74) *Attorney, Agent, or Firm* — Finnegan, Henderson, Farabow, Garrett & Dunner, LLP

(57) ABSTRACT

To reduce a manufacturing cost on anodization in an aluminum-type fuel cell case, a method of manufacturing a fuel cell case made of one of aluminum and aluminum alloy and for accommodating a fuel cell is provided, which includes forming, in a fuel cell case, through-holes for receiving pins when the fuel cell case is mounted on a vehicle, and forming alumite on a surface of the fuel cell case by anodizing the surface using the through-hole as a contact.

3 Claims, 6 Drawing Sheets

METHOD OF MANUFACTURING FUEL CELL CASE

CROSS REFERENCE TO RELATED APPLICATION

This application claims priority based on Japanese Patent Application No. 2014-230492, filed on Nov. 13, 2014, the contents of all of which are incorporated herein by reference in their entirety.

BACKGROUND OF THE INVENTION

The present invention relates to a method of manufacturing a fuel cell case.

As vehicles on which a fuel cell is mounted, a vehicle is proposed, in which a fuel cell module having a fuel cell case accommodating a fuel cell is disposed underfloor of the vehicle as disclosed in JP2014-151664A.

In a case of adopting an aluminum-based fuel cell case for the fuel cell module which is disposed underfloor of the vehicle, alumite may be formed on a surface of the fuel cell case by anodizing, so as to prevent corrosion. However, with such a fuel cell case as described in JP2014-151664A, a part having a surface to be used as a contact of anodization needs to be formed separately, which caused a problem of a manufacturing cost increase. Therefore, an art which can reduce a manufacturing cost on anodization which is performed on the aluminum based fuel cell case has been desired.

SUMMARY

The present invention is made in order to solve at least a part of the subject described above, and can be implemented in view of the following aspects.

(1) According to one aspect of the invention, a method of manufacturing a fuel cell case made of one of aluminum and aluminum alloy and for accommodating a fuel cell is provided. The method includes forming, in a fuel cell case, through-holes for receiving pins to position the fuel cell case when the fuel cell case is mounted on a vehicle, and forming alumite on a surface of the fuel cell case by anodizing the surface using the through-hole as a contact. According to this aspect, since the through-hole that is used for mounting on the vehicle is utilized as the contact of the anodization, the manufacturing cost can be reduced compared to a case where a part having a surface to be used as the contact of the anodization is separately formed.

(2) In the method of the aspect described above, through-holes may be formed by cutting. According to this aspect, a surface with a sufficient flatness as the contact in anodization can be formed.

(3) In the method of the aspect described above, a length of the fuel cell case in longitudinal directions of the vehicle may be shorter than that of the fuel cell case in lateral directions of the vehicle when the fuel cell case is mounted on the vehicle. In the fuel cell case, the through-holes may be formed at a first position that is forward of the fuel cell when the fuel cell case is mounted on the vehicle, and at a second position that is rearward of the fuel cell when the fuel cell case is mounted on the vehicle, respectively. According to this aspect, compared to a case where the through-holes are formed at one side position in the lateral directions, and at the other side position in the lateral direction, respectively, influence which is caused by positional offset between the through-holes and the pins can be reduced, and thus, the pins can easily be inserted through the through-holes.

(4) In the method of the aspect described above, in the fuel cell case, the through-holes may be formed at positions that are visible from one of the lateral directions of the vehicle when the fuel cell case is mounted on the vehicle. According to this aspect, the pins can be inserted through the respective through-holes while visually confirming the positions from one of the lateral directions of the vehicle.

Note that the present invention can be implemented in various forms other than the method of manufacturing the fuel cell case. For example, the invention can be implemented in forms, such as a fuel cell case, a fuel cell module, a vehicle, and a manufacturing device thereof.

BRIEF DESCRIPTION OF THE DRAWINGS

The present disclosure is illustrated by way of example and not by way of limitation in the figures of the accompanying drawings.

DETAILED DESCRIPTION OF EMBODIMENT

Figure 1:
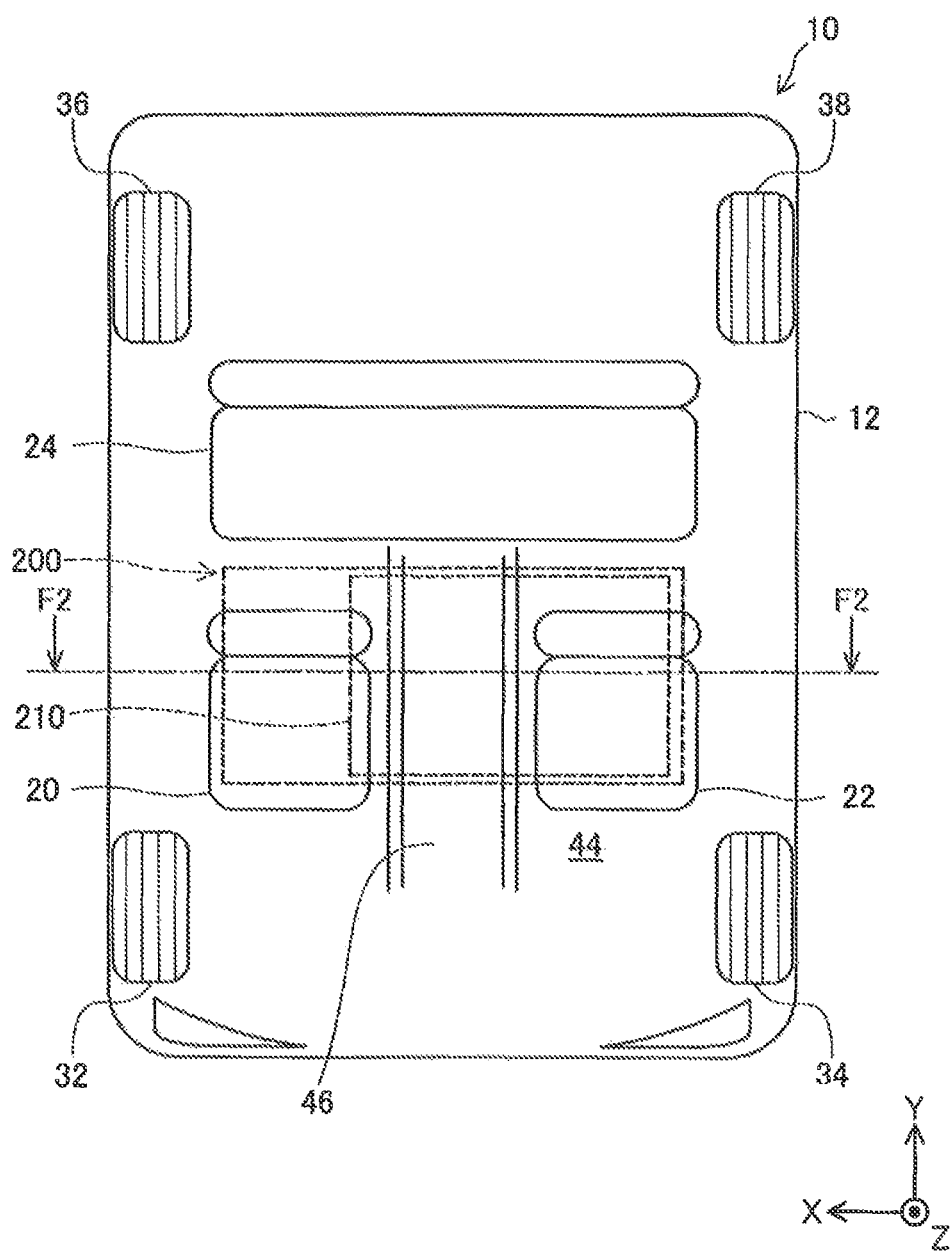
FIG. 1 is a view illustrating a schematic structure of a vehicle.
Figure 2:
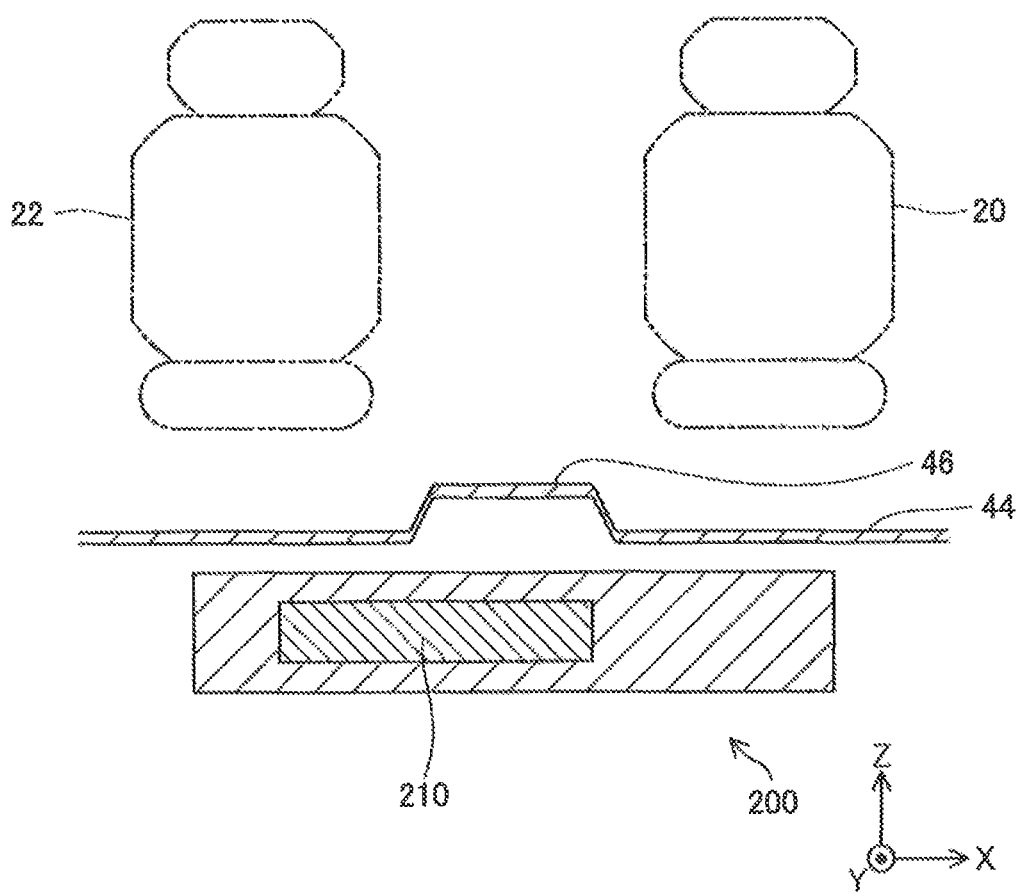
FIG. 2 is a cross-sectional view of the vehicle.

FIG. 1 is a view illustrating a schematic structure of a vehicle 10. FIG. 2 is a cross-sectional view of the vehicle 10 taken along a line F2-F2 in FIG. 1. X-, Y- and Z-axes perpendicular to each of are illustrated in FIG. 1, among which the X-axis is a coordinate axis of which a positive direction is from a left side to a right side of the vehicle 10 when the vehicle 10 is seen from the rear side, the Y-axis is a coordinate axis of which a positive direction is from a front side to a rear side of the vehicle 10, and the Z-axis is a coordinate axis of which a positive direction is opposite to a gravity direction. The X-, Y and Z-axes in FIG. 1 correspond to the X-, Y- and Z-axes in other drawings.

The vehicle 10 includes a chassis 12 and a fuel cell module 200. The vehicle 10 travels by electric power which is generated by the fuel cell module 200. The chassis 12 of the vehicle 10 constitutes a frame of the vehicle 10, The chassis 12 has seats 20, 22 and 24, and wheels 32, 34, 36 and 38.

Each of the seats 20, 22 and 24 is configured such that a passenger can be seated thereon. With respect to a center of the chassis 12 in the front-and-rear (longitudinal) directions and the left-and-right (lateral) directions, the seat 20 is located rightward (positive direction in X-axis), the seat 22 is located leftward (negative direction in X-axis), and the seat 24 is located rearward (positive direction in Y-axis) of the seats 20 and 22.

The wheels 32, 34, 36 and 38 are driven by the power which is generated by the fuel cell module 200. In a different embodiment, drive wheels of the vehicle 10 may only include the wheels 32 and 34 which are located forward of the center of the chassis 12, or the drive wheels may only include the wheels 36 and 38 which are located rearward of the center of the chassis 12.

The chassis 12 of the vehicle 10 includes a floor part 44 formed by a thin plate. The fuel cell module 200 is provided below of the floor part 44 in the gravity direction (negative direction in Z-axis). The floor part 44 has a bulging portion 46. The bulging portion 46 bulges upward in the gravity direction (positive direction in Z-axis) while extending rearward in the longitudinal directions.

The fuel cell module 200 of the vehicle 10 accommodates a fuel cell stack 210. The fuel cell stack 210 has a stacked structure in which a plurality of cells. Each cell generates power by an electrochemical reaction of reaction gas are stacked. In this embodiment, the fuel cell stack 210 receives hydrogen gas and air The fuel cell stack 210 generates power by an electrochemical reaction between hydrogen and oxygen.

Figure 3:
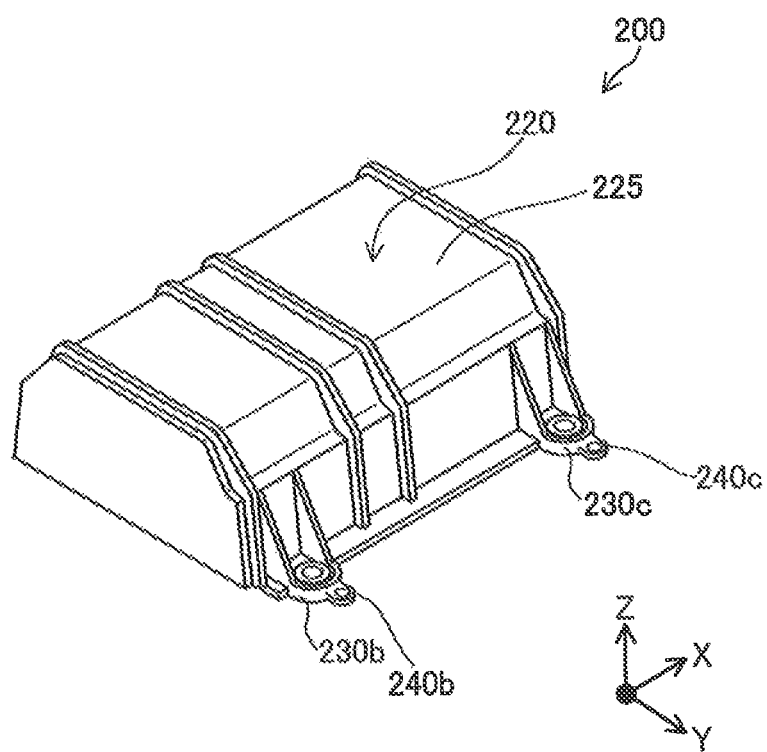
FIG. 3 is a view illustrating an external structure of a fuel cell module.
Figure 4:
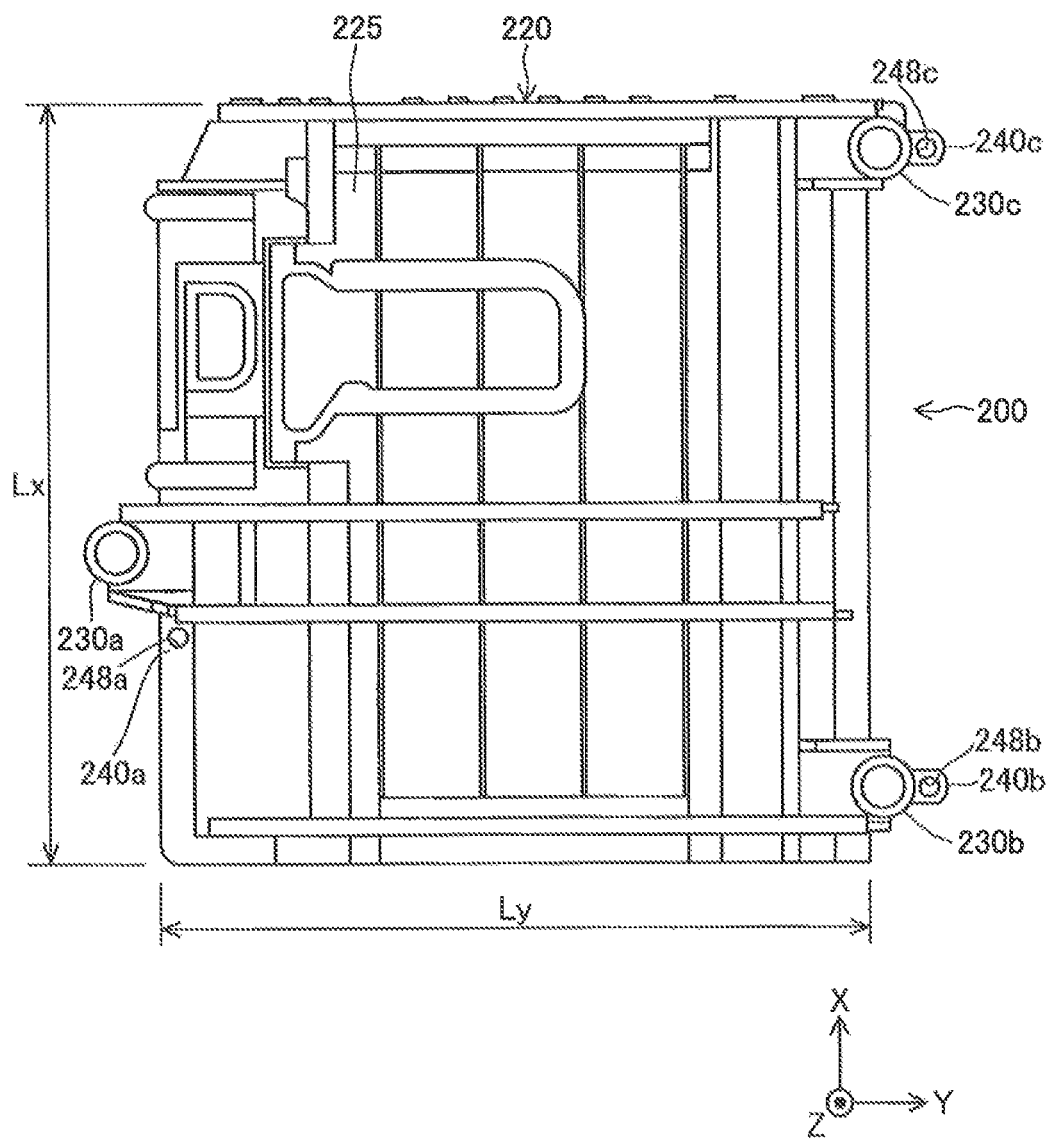
FIG. 4 is a plan view of the fuel cell module.

FIG. 3 is a view illustrating an external structure of the fuel cell module 200. FIG. 4 is a plan view of the fuel cell module 200 seen in the positive direction in the Z-axis.

The fuel cell module 200 has a fuel cell case 220. The fuel cell case 220 of the fuel cell module 200 accommodates the fuel cell stack 210. In this embodiment, the fuel cell case 220 is made of aluminum alloy. In a different embodiment, the fuel cell case 220 may be made of aluminum. The fuel cell case 220 includes a case body 225, mount parts 230*a*, 230*b* and 230*c*, and positioning parts 240*a*, 240*b* and 240*c*.

The case body 225 of the fuel cell case 220 has a box shape with an opening in the negative direction in the Z-axis. The case body 225 accommodates the fuel cell stack 210 therein. In this embodiment, the opening of the case body 225 is closed by a cover after placing the fuel cell stack 210 inside the case body 225. In this embodiment, in a state where the fuel cell module 200 is mounted on the vehicle 10, a length Ly of the case body 225 in the longitudinal directions of the vehicle 10 (positive direction in Y-axis) is shorter than a length Lx of the case body 225 in the lateral directions (positive direction in X-axis).

Each of the mount parts 230*a*, 230*b* and 230*c* of the fuel cell case 220 is formed with a through-hole. Although not illustrated, a mounting member which couples the fuel cell module 200 to the chassis 12 is press-fitted into each through-hole.

The mount parts 230*a*, 230*b* and 230*c* are provided at outer edge portions of the case body 225. In this embodiment, the mount part 230*a* is provided at a position that is in the outer edge portion on the negative-direction side in the Y-axis and corresponds to a central area of the case body 225 in the X-axis. In this embodiment, the mount parts 230*b* and 230*c* are provided at the outer edge portion on the positive-direction side in the Y-axis, and the mount part 230*b* is located on the negative-direction side in the X-axis with respect to the mount part 230*c*.

The positioning parts 240*a*, 240*h* and 240*c* of the fuel cell case 220 are reference positions on the vehicle 10 when mounting the fuel cell case 220 on the vehicle 10. The positioning parts 240*a*, 240*b* and 240*c* are provided at the outer edge portions of the case body 225. In this embodiment, at the outer edge portions of the case body 225, the positioning part 240*a* is provided near the mount part 230*a*, the positioning part 240*b* is provided near the mount part 230*b*, and the positioning part 240*c* is provided near the mount part 230 *c*.

The positioning part 240*a* is formed with a through-hole 248*a*. The positioning part 240*b* is formed with a through-hole 248*b*. The positioning part 240*c* is formed with a through-hole 248*c*. Pins for positioning the fuel cell case 220 in the vehicle 10 are inserted through the through-holes 248*a*, 248*b* and 248*c*, respectively. In this embodiment, the through-holes 248*a*, 248*b* and 248*c* are formed by cutting. In this embodiment, the through-holes 248*a*, 248*b* and 248*c* are formed through the positioning parts 240*a*, 240*b* and 240*c* along the Z-axis, respectively. In the description of this embodiment, a reference numeral "240" is used to refer to the three positioning parts comprehensively. Further, a reference numeral "248" is used to refer to the three through-holes comprehensively.

Figure 5:
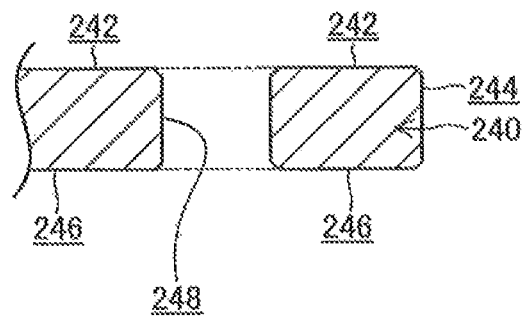
FIG. 5 show cross-sectional views of a positioning part.

FIGS. 5A and 5B show cross-sectional views of the positioning part 240 taken along the Z-axis.

Each positioning part 240 has a surface 242, a surface 244 and a surface 246, in addition to the through-hole 248. The surface 242 of the positioning part 240 is a partial surface of the fuel cell case 220, facing the positive direction in the Z-axis. The surface 244 of the positioning part 240 is a partial surface of the fuel cell case 220, extending along the Z-axis and constituting one of the outer edges of the fuel cell case 220. The surface 246 of the positioning part 240 is a partial surface of the fuel cell case 220, facing the negative direction in the Z-axis.

Alumite is formed on the surface of the fuel cell case 220. However in this embodiment, the surface of the fuel cell case 220 is anodized using the through-holes 248 as contacts, and therefore, alumite is not formed on the inner surface of the through-hole 248. In this embodiment, alumite is formed on the surface of the fuel cell case 220 including the surfaces 242, 244 and 246. In a different embodiment, the surface of the fuel cell case 220 except for the surface of the through-hole 248 may at least partially be masked so that alumite is not formed during the anodization. In this embodiment, alumite is not formed on any of the three through-holes 248*a*, 248*b* and 248*c*. In a different embodiment, at least one of a plurality of through-holes 248 may be used as the contact and not formed with alumite.

In this embodiment, the through-hole 248*a* is formed at a position of the fuel cell case 220, forward (negative direction in Y-axis) of the fuel cell stack 210 when the fuel cell case 220 is mounted on the vehicle 10. In this embodiment, the through-holes 248*b* and 248*c* are both formed at positions of the fuel cell case 220, rearward (positive direction in Y-axis) of the fuel cell stack 210 when the fuel cell case 220 is mounted on the vehicle 10.

In this embodiment, the three through-holes 248*a*, 248*b* and 248*c* are formed at positions which are visible from the left side of the vehicle 10 which is one of the lateral directions (negative direction in X-axis) when the fuel cell case 220 is mounted on the vehicle 10. In a different embodiment, the three through-holes 248*a*, 248*b* and 248*c* may be formed at positions which are visible from the right side of the vehicle 10 which is the other one of the lateral directions (positive direction in X-axis) when the fuel cell case 220 is mounted on the vehicle 10. The number of through-holes 248 formed at positions which are visible from one of the lateral directions when the fuel cell case 220 is mounted on the vehicle 10 is not limited to three, as long as it is two or more. In this embodiment, the positioning parts 240 are provided near the mount parts 230*a*, 230*b* and 230*c*, respectively. Thus, the positioning parts 240 can easily be positioned, and the mount parts 230*a*, 230*b* and 230*c* are surely anodized, which is effective in preventing corrosion of the mount parts 230*a*, 230*b* and 230*c*. In a different embodiment, the positioning parts 240 may be located other than near the mount parts 230*a*, 230*b* and 230*c*.

Figure 6:
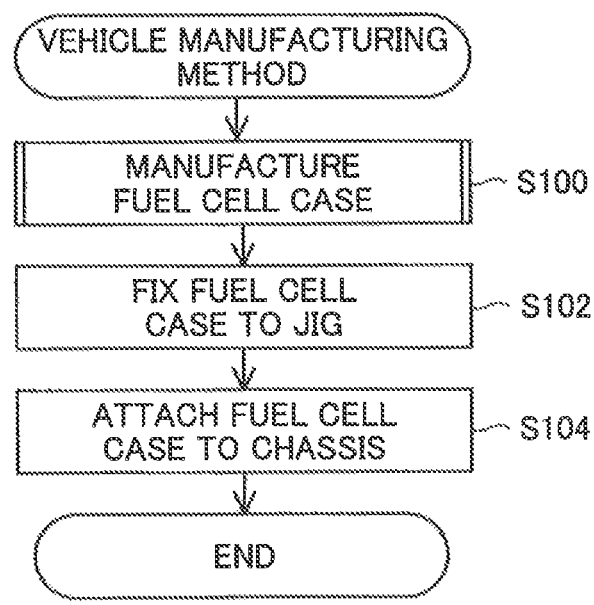
FIG. 6 is a flowchart illustrating a method of manufacturing the vehicle.

FIG. 6 is a flowchart illustrating a method of manufacturing the vehicle 10. When manufacturing the vehicle 10, a manufacturer manufactures the fuel cell case 220 (S100).

After the fuel cell case 220 is manufactured (S100), the manufacturer fixes the fuel cell case 220 constituting the fuel cell module 200 to a jig (S102). The manufacturer fixes the fuel cell case 220 to the jig by inserting pins through the through-holes 248 of the fuel cell case 220.

After the fuel cell case 220 is fixed to the jig (S102), the manufacturer positions the fuel cell case 220 on the chassis 12 in accordance with the positions of the jig, and attaches the fuel cell case 220 to the chassis 12 (S104). Through these steps, the manufacturing of the vehicle 10 on which the fuel cell module 200 is mounted completes.

Figure 7:
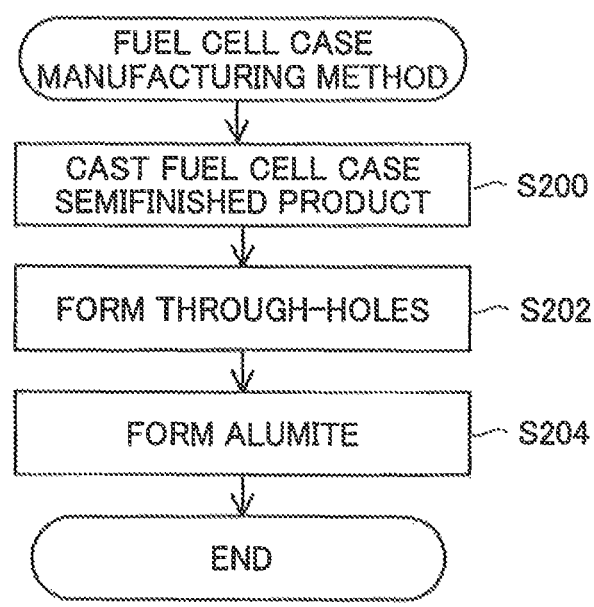
FIG. 7 is a flowchart illustrating a flow of manufacturing a fuel cell case.

FIG. 7 is a flowchart illustrating a specific flow of manufacturing the fuel cell case 220 (S100). In manufacturing the fuel cell case 220, the manufacturer forms a fuel cell case semifinished product of the fuel cell case 220 by casting (S200). In this embodiment, the manufacturer uses aluminum alloy to cast the fuel cell case semifinished product.

After the fuel cell case semifinished product is casted (S200), the manufacturer forms the through-holes 248 in the fuel cell case semifinished product (S202). In this embodiment, the manufacturer forms the three through-holes 248a, 248b and 248c. Further, the manufacturer forms the through-holes 248 in the fuel cell case semifinished product by cutting.

After the through-holes 248 are formed in the fuel cell case semifinished product (S202), the manufacturer forms alumite on the surface of the fuel cell case semifinished product by anodizing the surface using the through-holes 248 as the contacts (S204). In this embodiment, the manufacturer attaches, at the through-holes 248, the fuel cell case semifinished product to jigs which fixes the fuel cell case semifinished product in an electrolytic solution and applies a current to the fuel cell case semifinished product, and then, the manufacturer performs the anodization by using the fuel cell case semifinished product as a positive electrode. Thus, the through-holes 248 which contact with the jigs become the contacts of the anodization. As a result, alumite is not formed on the part of the inner of the through-hole 248, but is formed on other part of the surface of the fuel cell case semifinished product. In this embodiment, the manufacturer attaches one jig to each of the three through-holes 248a, 248b and 248c. In a different embodiment, the manufacturer may attach the jig to at least one of the through-holes 248. Through these steps, the manufacturing of the fuel cell case 220 completes.

According to the embodiment described above, since the through-holes 248 used for mounting the fuel cell case 220 on the vehicle 10 are utilized as the contacts of the anodization, the manufacturing cost can be reduced compared to the case where the part used as the contact of anodization is separately formed.

Moreover, since the through-holes 248 are formed by cutting, a surface with a sufficient flatness as the contact of anodization can be formed.

Further, in the state where the fuel cell case 220 is mounted on the vehicle 10, the length Ly of the fuel cell case 220 in the longitudinal directions of the vehicle 10 is shorter than the length Lx of the fuel cell case 220 in the lateral directions of the vehicle 10. The through-hole 248a is formed at the position of the fuel cell case 220 so that when the fuel cell case 220 is mounted on the vehicle 10, the through-hole 248a is located forward of the fuel cell stack 210. The through-holes 248b and 248c are formed at the positions of the fuel cell case 220 so that when the fuel cell case 220 is mounted on the vehicle 10, the through-holes 248b and 248c are located rearward of the fuel cell stack 210. Therefore, compared to a case where the through-holes are formed at one side position in the lateral directions, and at the other side position in the lateral direction, respectively, influence which is caused by positional offset between the through-holes 248 and the pins can be reduced, and thus, the pins can easily be inserted through the through-holes.

Further, in the fuel cell case 220, the through-holes 248 are formed at the respective positions which are visible from one of the lateral directions of the vehicle 10 when the fuel cell case 220 is mounted on the vehicle 10. Therefore, the pins can be inserted into the through-holes 248 while visually confirming the positions from the one of the lateral directions of the vehicle 10.

The present invention is not limited to the embodiments described above, and can be implemented in various structures without departing from the scope of the invention. For example, technical features in the embodiments corresponding to technical features of each aspect cited in the section of "SUMMARY OF THE INVENTION," can suitably be substituted and/or combined in order to achieve some or all of the subjects described above, or in order to obtain sonic or all of the effects described above. The technical features can suitably be deleted if they are not described as essential matters in this specification.

What is claimed is:

1. A method of manufacturing a fuel cell case made of one of aluminum and aluminum alloy and for accommodating a fuel cell, comprising:
    forming, in a fuel cell case, through-holes for receiving pins to position the fuel cell case when the fuel cell case is mounted on a vehicle;
    fixing a jig to an inner surface of at least one of the through-holes by inserting the pins through the through-holes; and
    forming alumite on a surface of the fuel cell case by anodizing the surface using the jig to apply current to the inner surface of the at least one of the through-holes, wherein
    the inner surface of the at least one of the through-holes includes a contact portion contacted by one of the receiving pins when the current is applied to the inner surface, and
    alumite is not formed on the contact portion of the inner surface of the at least one of the through-holes when current is applied thereto.

2. The method in accordance with claim 1,
    wherein a length of the fuel cell case in longitudinal directions of the vehicle is shorter than that of the fuel cell case in lateral directions of the vehicle when the fuel cell case is mounted on the vehicle, and
    wherein in the fuel cell case, the through-holes are formed at a first position that is forward of the fuel cell when the fuel cell case is mounted on the vehicle, and at a second position that is rearward of the fuel cell when the fuel cell case is mounted on the vehicle, respectively.

3. The method in accordance with claim 1, wherein in the fuel cell case, the through-holes are formed at positions that are visible from one of the lateral directions of the vehicle when the fuel cell case is mounted on the vehicle.

* * * * *